(12) United States Patent
Turtinen et al.

(10) Patent No.: US 8,909,216 B2
(45) Date of Patent: Dec. 9, 2014

(54) INTER-CELL DEVICE DISCOVERY IN DEVICE-TO-DEVICE COMMUNICATION

(75) Inventors: Samuli Turtinen, Ii (FI); Sami-Jukka Hakola, Kempele (FI); Timo K. Koskela, Oulu (FI); Anna Pantelidou, Oulu (FI)

(73) Assignee: Broadcom Corporation, Irvine, CA (US)

( * ) Notice: Subject to any disclaimer, the term of this patent is extended or adjusted under 35 U.S.C. 154(b) by 214 days.

(21) Appl. No.: 13/352,538

(22) Filed: Jan. 18, 2012

(65) Prior Publication Data

US 2013/0183963 A1 Jul. 18, 2013

(30) Foreign Application Priority Data

Jan. 16, 2012 (GB) .................................. 1200635.9

(51) Int. Cl.
*H04W 36/08* (2009.01)
*H04W 88/06* (2009.01)
(52) U.S. Cl.
USPC ...................................... 455/426.1; 455/517
(58) Field of Classification Search
CPC ...... H04W 76/23; H04W 8/005; H04W 24/10
USPC .............................................. 455/426.1, 517
See application file for complete search history.

(56) References Cited

U.S. PATENT DOCUMENTS

| | | | | |
|---|---|---|---|---|
| 2008/0259853 A1* | 10/2008 | Ito | .................................. | 370/329 |
| 2010/0165882 A1* | 7/2010 | Palanki et al. | ................ | 370/254 |
| 2010/0261469 A1* | 10/2010 | Ribeiro et al. | ................ | 455/423 |
| 2011/0026492 A1* | 2/2011 | Frenger et al. | ................ | 370/331 |
| 2012/0129517 A1* | 5/2012 | Fox et al. | ....................... | 455/425 |
| 2012/0163235 A1* | 6/2012 | Ho et al. | ......................... | 370/254 |
| 2012/0265818 A1* | 10/2012 | Van Phan et al. | ............. | 709/204 |
| 2013/0182583 A1* | 7/2013 | Siomina et al. | ............... | 370/252 |

FOREIGN PATENT DOCUMENTS

| | | |
|---|---|---|
| WO | WO 2005/101886 A2 | 10/2005 |
| WO | WO 2008/023929 A2 | 2/2008 |
| WO | WO 2008/112255 A2 | 9/2008 |
| WO | WO 2011/124015 A1 | 10/2011 |
| WO | WO 2012/023887 A1 | 2/2012 |

OTHER PUBLICATIONS

S1-113101, 3GPP TSG-SA WG1 Meeting #56, San Francisco, CA, USA, Nov. 14-18, 2011, "Local Advertising UE Settings, Charging and Interoperability Use Case", Deutsche Telekom, Alcatel-Lucent, 1 pg.
Tdoc-RP-110706, 3GPP TSG-RAN #52, Bratislava, Slovakia, May 31-Jun. 3, 2011, "On the Need for a 3GPP Study on LTE device-to-device Discovery and Communication", Qualcomm Inc., 2 pgs.

(Continued)

*Primary Examiner* — Qun Shen
(74) *Attorney, Agent, or Firm* — Stanton IP Law

(57) ABSTRACT

There are provided measures for enabling an inter-cell device discovery in device-to-device communication. Such measures may exemplarily include observing, at a device residing in a cell representing a serving cell of said device, a device-to-device discovery signal from another device residing in another cell representing a non-serving cell of said device, and modifying at least one of one or more cell reselection parameters referring to the serving cell of said device and one or more cell selection parameters referring to the non-serving cell of said device on the basis of the observed device-to-device discovery signal.

20 Claims, 8 Drawing Sheets

(56) References Cited

OTHER PUBLICATIONS

Tdoc RP-110707, TSG-RAN #52, "Study on LTE Device to Device Discovery and Communication—Radio Aspects", 5 pgs, May 31-Jun. 3, 2011.

3GPP TS 36.304 V10.3.0 (Sep. 2011), "3$^{rd}$ Generation Partnership Project; Technical specification Group radio Access Network; Evolved Universal Terrestrial Radio Access (E-UTRA); User Equipment (UE) Procedures in Idle Mode (Release 10)", 33 pgs.

* cited by examiner

INTER-CELL DEVICE DISCOVERY IN DEVICE-TO-DEVICE COMMUNICATION

FIELD OF THE INVENTION

The present invention relates to an inter-cell device discovery in device-to-device communication. More specifically, the present invention relates to measures (including methods, apparatuses and computer program products) for enabling an inter-cell device discovery in device-to-device communication.

BACKGROUND

In modern and future communication systems, device-to-device (D2D) communication constitutes an issue which is currently under study. Typically, in a D2D communication, two or more devices, such as terminals, mobile stations or user equipments, directly communicate with each other without involving a network entity or any network infrastructure, such as a base station or an access node of a cellular communication network. In this regard, it is currently expected that such D2D communication is capable of intercepting the demand for proximity-based applications in modern and future communication systems. Currently, D2D communication is being studied for example in the context of LTE and LTE-A cellular systems.

In the context of D2D communication, aspects such as device discovery, communication link setup, etc. are studied in terms of enhancements of radio-related layers, and system and security aspects, etc. are studied in terms of enhancements of the overall network architecture. As a result, devices shall be enabled to discover each other and potentially communicate directly over the air interface, when this makes sense from a system management point of view, upon appropriate network supervision. Also, such radio-based discovery and communication process shall be coupled with a system architecture and a security architecture that enables operators to retain control of the device behavior, for example which device can emit discovery signals, when and where discovery signals can be emitted, what information discovery signals shall carry, and what devices should do once they discover each other.

Service requirements and use cases for/in proximity device discovery and D2D communication, which shall be supported, are currently under development. In this regard, it is proposed that proximity device discovery and D2D communication shall be supported across cell borders, i.e. in an inter-cell manner.

For/in such inter-cell or cell border crossing proximity device discovery and D2D communication, problems arise from the situation that the devices reside in different cells, i.e. are served by different cells or base stations/access nodes thereof, while it would be beneficial if these devices were served by the same cell or base station/access node thereof, e.g. from a radio resource control (RRC) point of view. Such problems exemplarily involve problems in D2D communication link setup, e.g. a possibility of unnecessary handovers when routing devices, while setting up a D2D communication link.

Accordingly, in terms of proximity device discovery and D2D communication, there is a desire to improve inter-cell device discovery in D2D communication.

SUMMARY

Various exemplary embodiments of the present invention aim at addressing at least part of the above issues and/or problems and drawbacks.

Various aspects of exemplary embodiments of the present invention are set out in the appended claims.

According to an exemplary aspect of the present invention, there is provided a method comprising observing, at a device residing in a cell representing a serving cell of said device, a device-to-device discovery signal from another device residing in another cell representing a non-serving cell of said device, and modifying at least one of one or more cell reselection parameters referring to the serving cell of said device and one or more cell selection parameters referring to the non-serving cell of said device on the basis of the observed device-to-device discovery signal.

According to an exemplary aspect of the present invention, there is provided an apparatus comprising at least one processor, at least one memory including computer program code, and at least one interface configured for communication with at least another apparatus, the at least one processor, with the at least one memory and the computer program code, being configured to cause the apparatus to perform: observing, at a device residing in a cell representing a serving cell of said device, a device-to-device discovery signal from another device residing in another cell representing a non-serving cell of said device, and modifying at least one of one or more cell reselection parameters referring to the serving cell of said device and one or more cell selection parameters referring to the non-serving cell of said device on the basis of the observed device-to-device discovery signal.

According to an exemplary aspect of the present invention, there is provided a computer program product comprising computer-executable computer program code which, when the program is run on a computer (e.g. a computer of an apparatus according to the aforementioned apparatus-related exemplary aspect of the present invention), is configured to cause the computer to carry out the method according to the aforementioned method-related exemplary aspect of the present invention.

Such computer program product may comprise or be embodied as a (tangible) computer-readable (storage) medium or the like on which the computer-executable computer program code is stored, and/or the program may be directly loadable into an internal memory of the computer or a processor thereof.

Advantageous further developments or modifications of the aforementioned exemplary aspects of the present invention are set out in the following.

By way of exemplary embodiments of the present invention, there is provided an inter-cell device discovery in device-to-device communication (in/for cellular communication systems). More specifically, by way of exemplary embodiments of the present invention, there are provided measures and mechanisms for enabling an inter-cell device discovery in device-to-device communication (in/for cellular communication systems).

Thus, enhancements are achieved by methods, apparatuses and computer program products enabling an inter-cell device discovery in device-to-device communication (in/for cellular communication systems).

BRIEF DESCRIPTION OF DRAWINGS

For a more complete understanding of exemplary embodiments of the present invention, reference is now made to the following description taken in connection with the accompanying drawings in which.

DESCRIPTION OF EXEMPLARY EMBODIMENTS

Exemplary aspects of the present invention will be described herein below. More specifically, exemplary aspects of the present are described hereinafter with reference to particular non-limiting examples and to what are presently considered to be conceivable embodiments of the present invention. A person skilled in the art will appreciate that the invention is by no means limited to these examples, and may be more broadly applied.

It is to be noted that the following description of the present invention and its embodiments mainly refers to specifications being used as non-limiting examples for certain exemplary network configurations and deployments. Namely, the present invention and its embodiments are mainly described in relation to 3GPP specifications being used as non-limiting examples for certain exemplary network configurations and deployments. In particular, a LTE/LTE-Advanced communication system is used as a non-limiting example for the applicability of thus described exemplary embodiments. As such, the description of exemplary embodiments given herein specifically refers to terminology which is directly related thereto. Such terminology is only used in the context of the presented non-limiting examples, and does naturally not limit the invention in any way. Rather, any other network configuration or system deployment, etc. may also be utilized as long as compliant with the features described herein. Such other network configuration or system deployment may for example relate to WCDMA, CDMA2000, GSM, GPRS, UMTS, and/or the like.

Hereinafter, various embodiments and implementations of the present invention and its aspects or embodiments are described using several alternatives. It is generally noted that, according to certain needs and constraints, all of the described alternatives may be provided alone or in any conceivable combination (also including combinations of individual features of the various alternatives).

According to exemplary embodiments of the present invention, in general terms, there are provided mechanisms, measures and means for enabling an inter-cell device discovery in device-to-device (D2D) communication (in/for cellular communication systems).

In the following, exemplary embodiments of the present invention are described with reference to methods, procedures and functions, as well as with reference to structural arrangements and configurations.

Figure 1:
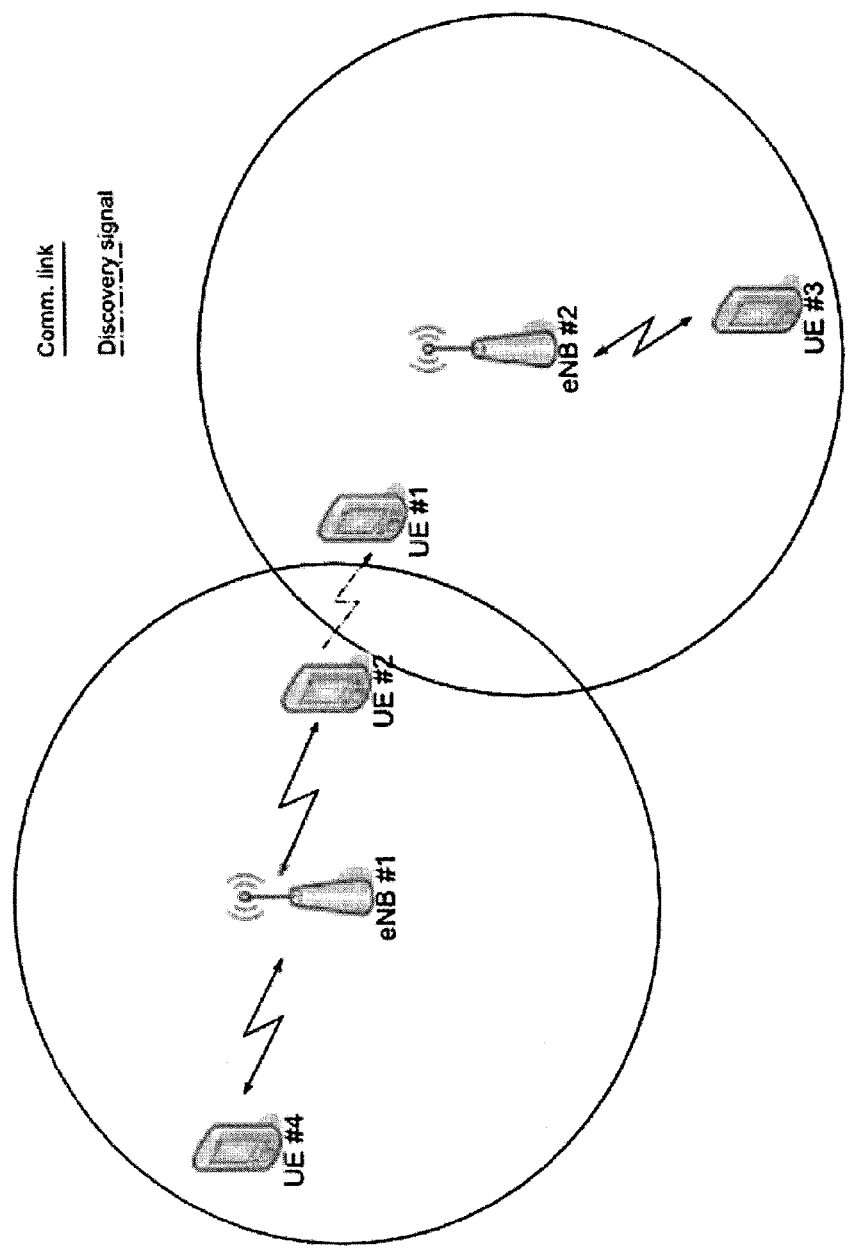
FIG. 1 shows a schematic diagram illustrating a system scenario in the context of D2D communication in a cellular communication system, for which exemplary embodiments of the present invention are applicable.

FIG. 1 shows a schematic diagram illustrating a system scenario in the context of D2D communication in a cellular communication system, for which exemplary embodiments of the present invention are applicable.

As shown in FIG. 1, the exemplary system scenario is assumed to comprise two cells, each cell being served by one of the base stations eNB#1 and eNB#2, and four devices UE#1, UE#2, UE#3, and UE#4, each device residing in one of the two cells, i.e. being served by one of the two cells or by the respective base station thereof. Further, it is assumed that the device UE#2 transmits a D2D discovery signal which is received by the device UE#1. The transmitter of the D2D discovery signal, i.e. UE#2, is assumed to be connected to the cell of eNB#1 and to be in RRC_CONNECTED state, while the receiver of the D2D discovery signal, i.e. UE#1, is assumed to be in RRC_IDLE state. As indicated by UE#1 being located within the line indicting the cell border of the cell of eNB#2, it is further assumed that the device UE#1 would connect to, i.e. camp on, the cell of eNB#2 for communication purposes.

As UE#1 is assumed to be able to listen to D2D discovery signals and, in the illustrated system scenario, to observe the D2D discovery signal transmitted by UE#2, UE#1 may decide that it is interested in the observed D2D discovery signal and would like to, e.g., set up a communication link with UE#2 (e.g., a D2D communication). As mentioned above, in terms of setting up a communication link between UE#1 and UE#2, it would be beneficial if these two devices were served by the same base station, e.g. from the radio resource control (RRC) point of view.

In view thereof, exemplary embodiments of the present invention provide for mechanisms, measures and means for enabling an inter-cell device discovery in device-to-device (D2D) communication (in/for cellular communication systems), which facilitates that two devices (initially) residing in different cells are served by the same base station upon discovery.

Hereinafter, procedures and functions relating to such inter-cell device discovery in device-to-device (D2D) communication according to exemplary embodiments of the present invention are described in more detail with reference to FIGS. 2 to 6.

The subsequently described procedures and functions according to FIGS. 2 to 6 may be carried out at any device capable of D2D communication, e.g. any such terminal, mobile station, user equipment or modem. For example, such procedures and functions may be carried out by UE#1 according to FIG. 1.

Figure 2:
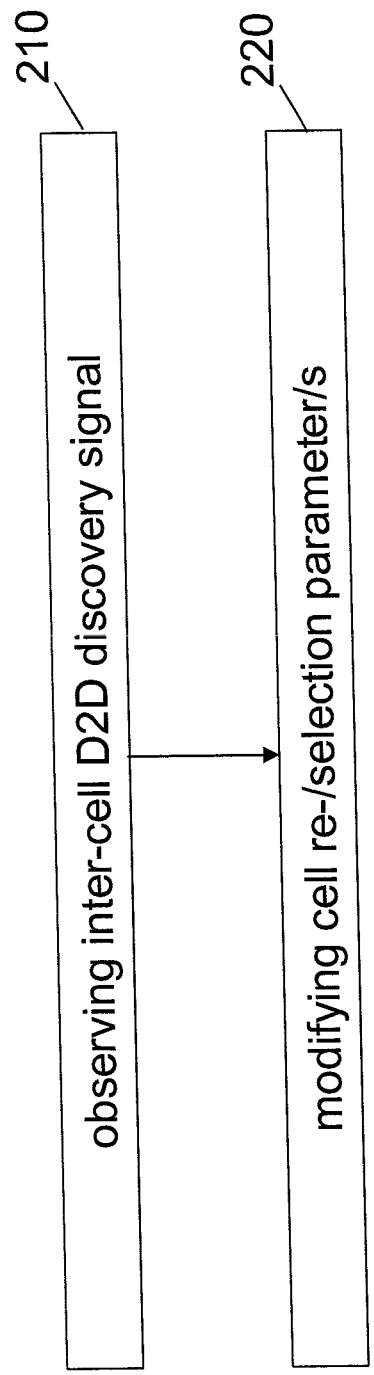
FIG. 2 shows a flowchart of a first example of a procedure according to exemplary embodiments of the present invention.

FIG. 2 shows a flowchart of a first example of a procedure according to exemplary embodiments of the present invention.

As shown in FIG. 2, a corresponding procedure according to exemplary embodiments of the present invention comprises an operation (210) of observing an inter-cell D2D discovery signal from another device, and an operation (220) of modifying at least one of one or more cell reselection parameters and one or more cell selection parameters on the basis of the observed D2D discovery signal.

According to exemplary embodiments of the present invention, in the operation 210, the observed D2D discovery signal originates from a device (e.g. UE#2 in FIG. 1) residing in a cell (e.g. that of eNB#1 in FIG. 1) representing a non-serving cell of the device in question performing the procedure, and is observed at/by the device in question performing the procedure (e.g. UE#1 in FIG. 1) which resides in a cell (e.g. that of eNB#2 in FIG. 1) representing a serving cell thereof. In the operation 220, one or more cell reselection parameters referring to the serving cell of the device in question performing the procedure are modified on the basis of the observed D2D discovery signal and/or one or more cell selection parameters referring to the non-serving cell of the device in question performing the procedure are modified on the basis of the observed D2D discovery signal.

As indicated above, according to exemplary embodiments of the present invention, cell reselection parameters refer to the serving cell of the device in question, i.e. they relate to a cell reselection process in terms of a reselection of the currently serving/residing cell, and cell selection parameters refer to the non-serving cell of the device in question, i.e. they relate to a cell selection process in terms of a selection of the currently non-serving/non-residing cell representing a potential target serving/residing cell for the device in question.

Figure 3:
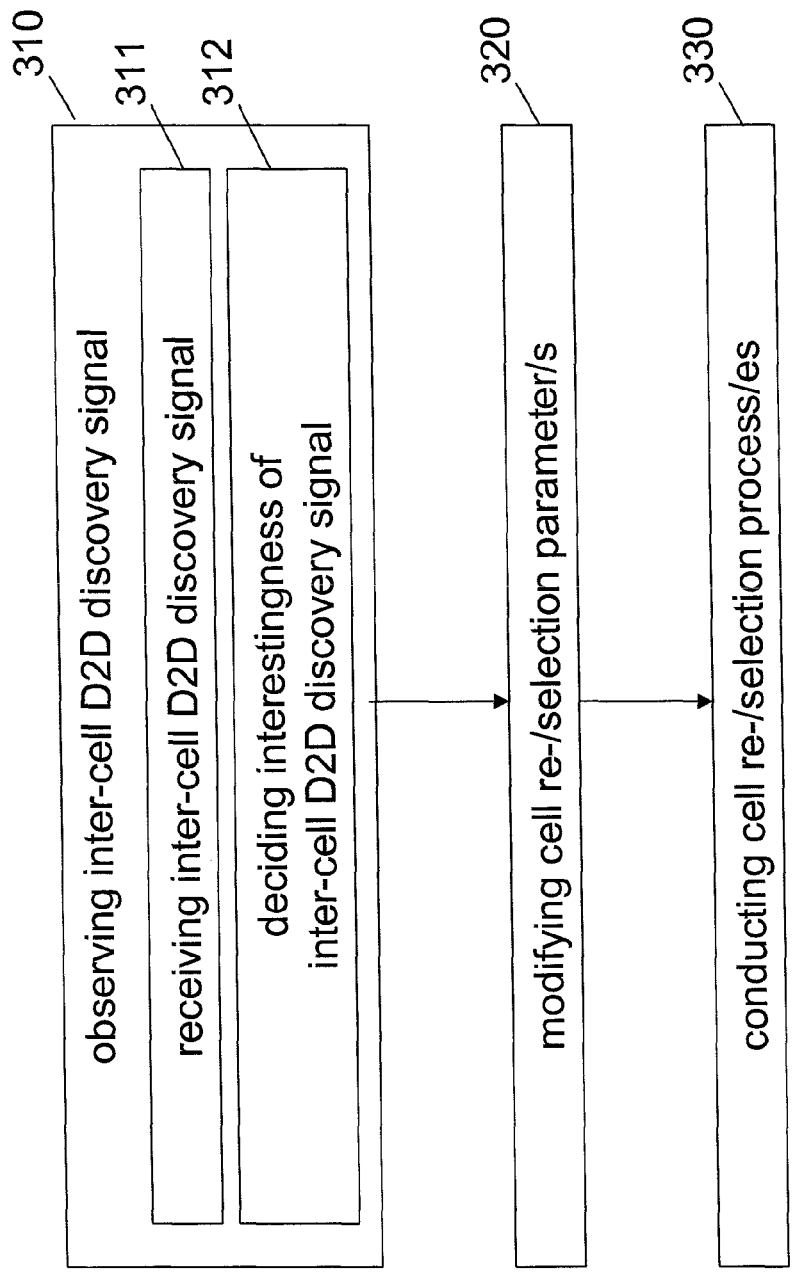
FIG. 3 shows a flowchart of a second example of a procedure according to exemplary embodiments of the present invention.

FIG. 3 shows a flowchart of a second example of a procedure according to exemplary embodiments of the present invention.

As shown in FIG. 3, a corresponding procedure according to exemplary embodiments of the present invention comprises an operation (310) of observing an inter-cell D2D discovery signal from another device, an operation (320) of modifying at least one of one or more cell reselection parameters and one or more cell selection parameters on the basis of the observed D2D discovery signal, and an operation (330) of conducting at least one of a cell reselection process on the basis of the modified one or more cell reselection parameters and a cell selection process on the basis of the modified one or more cell selection parameters.

According to exemplary embodiments of the present invention, the operations 310 and 320 according to FIG. 3 functionally correspond to the operations 210 and 220 according to FIG. 2.

According to exemplary embodiments of the present invention, the D2D discovery signal observation according to operation 310 comprises an operation (311) of receiving the D2D discovery signal and an operation (312) of deciding on an interestingness of the received D2D discovery signal in terms of a D2D communication link setup between the device in question performing the procedure and the other device from which the D2D discovery signal has been transmitted. Such decision may be based on any conceivable factor or condition, e.g. those being indicative of a potential desire, need or expediency of establishing a D2D communication with the device from which the D2D discovery signal has been transmitted. Accordingly, any subsequent operations may be based on a D2D discovery signal of interest only, while any non-interesting D2D discovery signals being observed/received may be discarded or ignored.

According to exemplary embodiments of the present invention, in the operation 330, a cell reselection process referring to the serving cell of the device in question performing the procedure is conducted on the basis of the modified one or more cell reselection parameters and/or a cell selection process referring to the non-serving cell of the device in question performing the procedure (which represents a target cell of cell selection) is conducted on the basis of the modified one or more cell selection parameters.

It is noted that, while the exemplary procedure according to FIG. 3 illustrates both the operations 311 and 312 within the operation 310 and the operation 330, exemplary embodiments of the present invention also involve procedures including the operations 311 and 312 within the operation 310 or the operation 330.

Referring to any one of the exemplary procedures according to FIGS. 2 and 3, the device in question performing the procedure may be in an idle state in terms of radio resource control, i.e. in RRC_IDLE state. That is, the device in question performing the procedure may be not connected to the base station of its serving cell. Accordingly, the serving cell may comprise any one of a serving cell, a suitable cell and an acceptable cell in accordance with current specifications.

Referring to any one of the exemplary procedures according to FIGS. 2 and 3, the D2D discovery signal may comprise a cell identifier (cell ID) of the non-serving cell, i.e. the cell in which the device resides, which has transmitted the D2D discovery signal. By means of such cell identifier, any reference to the non-serving cell of the device in question performing the procedure may be accomplished, e.g. in terms of cell selection parameter/s, a cell selection process, any related measurements, and the like.

Figure 4:
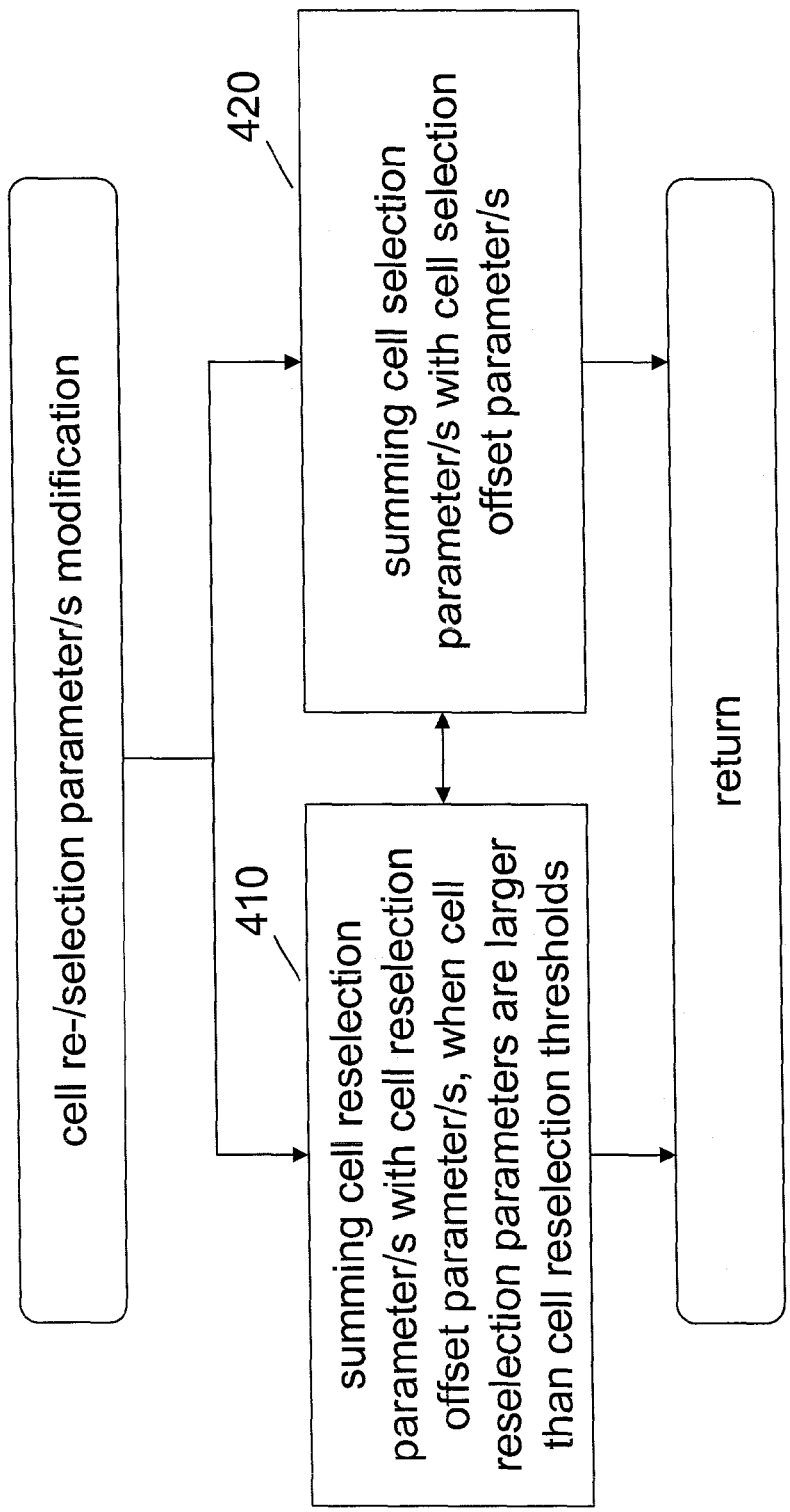
FIG. 4 shows a flowchart of a first example of a procedure for cell re-/selection parameter/s modification according to exemplary embodiments of the present invention.

FIG. 4 shows a flowchart of a first example of a procedure for cell re-/selection parameter/s modification according to exemplary embodiments of the present invention.

As shown in FIG. 4, a corresponding procedure according to exemplary embodiments of the present invention comprises one or both of the following operations before returning to the procedure from which the present procedure is initiated, e.g. operation 220 according to FIG. 2 or operation 320 according to FIG. 3. In case both operations are comprised, they may be performed in any sequence, as indicated by the double-headed arrow in-between the block representing these two operations.

According to exemplary embodiments of the present invention, the procedure may comprise an operation (410) of summing cell reselection parameter/s referring to the serving cell of the device in question performing the procedure with cell reselection offset parameter/s referring to the serving cell of the device in question performing the procedure. In particular, operation 410 may comprise calculation of a sum of a power-related cell reselection parameter referring to the serving cell of the device in question performing the procedure and a power-related cell reselection offset parameter referring to the serving cell of the device in question performing the procedure, and/or calculation of a sum of a quality-related cell reselection parameter referring to the serving cell of the device in question performing the procedure and a quality-related cell reselection offset parameter referring to the serving cell of the device in question performing the procedure.

According to exemplary embodiments of the present invention, such summing operation may specifically be performed when the power-related cell reselection parameter referring to the serving cell is larger than a power-related cell reselection threshold and the quality-related cell reselection parameter referring to the serving cell is larger than a quality-related cell reselection threshold. Under such conditions, no intra-/inter-frequency measurement and no cell reselection process are typically performed according to current specifications.

By way of example, referring to current specifications, the power-related cell reselection parameter may be Srxlev representing a (serving) cell re-/selection receive power level value (in dB), the quality-related cell reselection parameter may be Squat representing a (serving) cell re-/selection quality value (in dB), the power-related cell reselection threshold may be $S_{IntraSearchP}$ representing an intra-frequency measurement threshold for Srxlev, and the quality-related cell reselection threshold may be $S_{IntraSearchQ}$ representing an intra-frequency measurement threshold for Squal. Further, the power-related cell reselection offset parameter may be represented by $Q_{rxlev\_CREoffset}$ representing a (serving) cell receive power level value (e.g. RSRP) for CRE offset purposes, and the quality-related cell reselection offset parameter may be represented by $Q_{qual\_CREoffset}$ representing a (serving) cell quality level value (e.g. RSRQ) for CRE offset purposes.

In such example, the above-described operation 410 may be performed, when the serving cell fulfils $Srxlev>S_{IntraSearchP}$ and $Squal>S_{IntraSearchQ}$, and may comprise the calculation of $Srxlev+Q_{rxlev\_CREoffset}$ and/or the calculation of $Squal+Q_{qual\_CREoffset}$.

According to exemplary embodiments of the present invention, the power-related cell reselection offset parameter referring to the serving cell of the device in question performing the procedure and/or the quality-related cell reselection offset parameter referring to the serving cell of the device in question performing the procedure is defined such that the aforementioned summing operation increases a probability of a cell reselection process referring to the serving cell of the device in question performing the procedure being conducted on the basis of the thus modified power/quality-related cell reselection parameters, respectively.

In the above example, the parameters $Q_{rxlev\_CREoffset}$ and $Q_{qual\_CREoffset}$ may be defined such that it will be more likely that cell reselection measurements are triggered after the D2D discovery signal is observed from a non-serving cell. Namely, the parameters $Q_{rxlev\_CREoffset}$ and $Q_{qual\_CREoffset}$ may be defined such that the serving cell (more likely) fulfills $Srxlev+Q_{rxlev\_CREoffset}<S_{IntraSearchP}$ and/or $Squal+Q_{qual\_CREoffset}<S_{IntraSearchQ}$.

Accordingly, exemplarily assuming that the values of Srxlev, Squal, $S_{IntraSearchP}$ and $S_{IntraSearchP}$ are positive values, the values of $Q_{rxlev\_CREoffset}$ and $Q_{qual\_CREoffset}$ may be negative values. If so, the aforementioned summing operation leads to a decrease in the absolute value of the value to be compared with the respective threshold value, thus increasing the probability of a condition for a cell reselection process being increased.

According to exemplary embodiments of the present invention, the procedure may comprise an operation (420) of summing cell selection parameter/s referring to the non-serving cell of the device in question performing the procedure with cell selection offset parameter/s referring to the non-serving cell of the device in question performing the procedure. In particular, operation 420 may comprise calculation of a sum of a power-related cell selection parameter referring to the non-serving cell of the device in question performing the procedure and a power-related cell selection offset parameter referring to the non-serving cell of the device in question performing the procedure, and/or calculation of a sum of a quality-related cell selection parameter referring to the non-serving cell of the device in question performing the procedure and a quality-related cell selection offset parameter referring to the non-serving cell of the device in question performing the procedure.

By way of example, referring to current specifications, the power-related cell selection parameter may be $Srxlev_{non-serving\_cell}$ representing a (non-serving) cell re-/selection receive power level value (in dB), the quality-related cell selection parameter may be $Squal_{non-serving\_cell}$ representing a (non-serving) cell re-/selection quality value (in dB). Further, the power-related cell selection offset parameter may be represented by $Q_{target\_cell\_rxlev\_CREoffset}$ representing a (non-serving) cell receive power level value (e.g. RSRP) for CRE offset purposes, and the quality-related cell selection offset parameter may be represented by $Q_{target\_cell\_qual\_CREoffset}$ representing a (non-serving) cell quality level value (e.g. RSRQ) for CRE offset purposes.

In such example, due to the device in question performing the procedure resides in its serving cell (and would potentially camp on its serving cell according to conventional cell re-/selection), the non-serving cell doe not fulfill $Srxlev_{non-serving\_cell}>0$ and $Squal_{non-serving\_cell}>0$, which is the cell selection condition according to current specifications.

Further, the above-described operation 420 may comprise the calculation of $Srxlev_{non-serving\_cell}+Q_{target\_cell\_rxlev\_CREoffset}$ and/or the calculation of $Squal_{non-serving\_cell}+Q_{target\_cell\_qual\_CREoffset}$.

According to exemplary embodiments of the present invention, the power-related cell selection offset parameter referring to the non-serving cell of the device in question performing the procedure and/or the quality-related cell selection offset parameter referring to the non-serving cell of the device in question performing the procedure is defined such that the aforementioned summing operation extends a range of the non-serving cell for a cell selection process referring to the non-serving cell of the device in question performing the procedure conducted on the basis of the thus modified power/quality-related cell selection parameters, respectively.

In the above example, the parameters $Q_{target\_cell\_rxlev\_CREoffset}$ and $Q_{target\_cell\_qual\_CREoffset}$ may be defined such that it will be more likely that the range of the non-serving cell, from which the D2D discovery signal in question was transmitted, will extend from point of view of the D2D discovery signal receiver device (i.e. the device in question performing the procedure). Stated in other words, the parameters $Q_{target\_cell\_rxlev\_CREoffset}$ and $Q_{target\_cell\_qual\_CREoffset}$ may be defined such that the non-serving cell (more likely) fulfills $Srxlev_{non-serving\_cell}+Q_{target\_cell\_rxlev\_CREoffset}>0$ and $Squal_{non-serving\_cell}+Q_{target\_cell\_qual\_CREoffset}>0$. Thereby, a cell range expansion (CRE) of the non-serving cell may be realized.

Accordingly, the values of $Q_{target\_cell\_rxlev\_CREoffset}$ and $Q_{target\_cell\_qual\_CREoffset}$ may be positive values. If so, the aforementioned summing operation leads to an increase in the absolute value of the value to be used for cell selection evaluation, thus increasing the probability of a condition for the device in question selecting the non-serving cell as a result of a cell selection process.

The effects being achievable by means of exemplary embodiments of the present invention, as described above, is explained in more detail with reference to FIG. 7 below.

Figure 5:
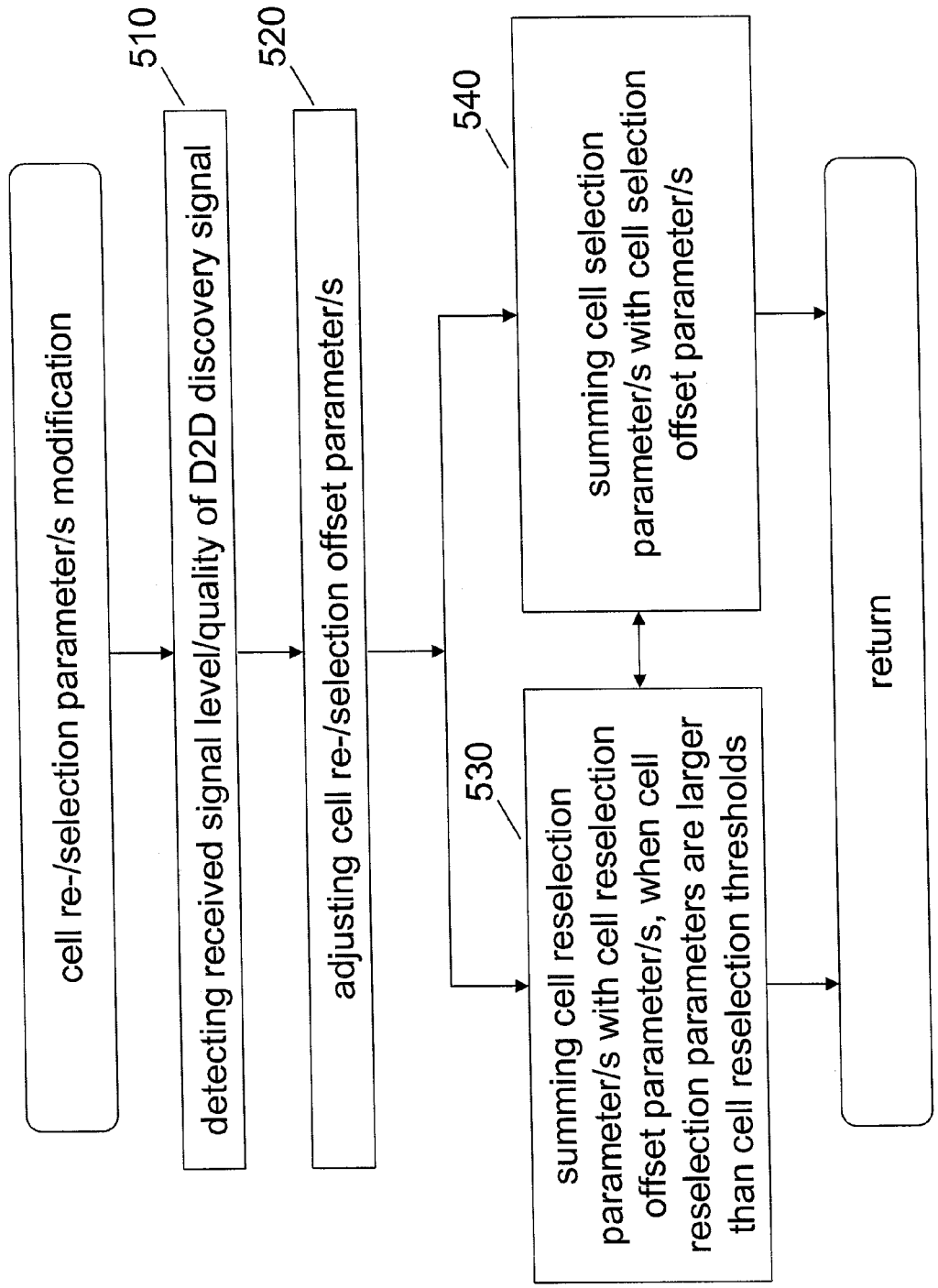
FIG. 5 shows a flowchart of a second example of a procedure for cell re-/selection parameter/s modification according to exemplary embodiments of the present invention.

FIG. 5 shows a flowchart of a second example of a procedure for cell re-/selection parameter/s modification according to exemplary embodiments of the present invention.

As shown in FIG. 5, a corresponding procedure according to exemplary embodiments of the present invention comprises an operation (510) of detecting at least one of a received signal level and a received signal quality of the D2D discovery signal being observed, and an operation (520) of adjusting at least one of the one or more cell reselection parameters and the one or more cell selection parameters on the basis of the detected received signal quality of the device-to-device discovery signal. The operations 530 and 540 according to FIG. 5 functionally correspond to the operations 410 and 420 according to FIG. 4, which are based on the results of the preceding operations 510 and 520 according to FIG. 5. That is to say, in any one of the operations 530 and 540, the respective summing operation is performed using the (power/quality-related) cell re-/selection offset parameter/s as adjusted in operation 520.

According to exemplary embodiments of the present invention, in the operation 520, the power-related cell reselection offset parameter (e.g. $Q_{rxlev\_CREoffset}$) referring to the serving cell of the device in question performing the procedure may be adjusted on the basis of the detected received signal level of the D2D discovery signal, and/or the quality-related cell reselection offset parameter (e.g. $Q_{qual\_CREoffset}$) referring to the serving cell of the device in question performing the procedure may be adjusted on the basis of the detected received signal quality of the device-to-device discovery signal.

Alternatively or additionally, according to exemplary embodiments of the present invention, in the operation 520, the power-related cell selection offset parameter (e.g. $Q_{target\_cell\_rxlev\_CREoffset}$) referring to the non-serving cell of the device in question performing the procedure may be adjusted on the basis of the detected received signal level of the D2D discovery signal, and/or the quality-related cell selection offset parameter (e.g. $Q_{target\_cell\_qual\_CREoffset}$) referring to the non-serving cell of the device in question performing the procedure may be adjusted on the basis of the detected received signal quality of the device-to-device discovery signal.

By means of the adjustment operation 520 according to exemplary embodiments of the present invention, it may be realized that any one or more of the cell re-/selection offset parameters (e.g. $Q_{rxlev\_CREoffset}$, $Q_{qual\_CREoffset}$, $Q_{target\_cell\_rxlev\_CREoffset}$, $Q_{target\_cell\_qual\_CREoffset}$) affect less on the cell re-/selection parameters when the received signal level/quality of the D2D discovery signal in question is low(lower)/poor(poorer), and affect more on the cell re-/selection parameters when the received signal level/quality of the D2D discovery signal in question is high(higher)/good (better). Such relationship may for example be accomplished by way of any sort of proportionality between the (absolute) value of a respective cell re-/selection offset parameter and received signal level/quality of the D2D discovery signal in question (wherein such proportionality may for example be of linear, non-linear or step-wise nature, or the like)

Generally speaking, the cell re-/selection offset parameter/s according to exemplary embodiments of the present invention (e.g. $Q_{rxlev\_CREoffset}$, $Q_{qual\_CREoffset}$, $Q_{target\_cell\_rxlev\_CREoffset}$, $Q_{target\_cell\_qual\_CREoffset}$) may partly or fully be a function of received signal level/quality of the observed D2D discovery signal in question.

Figure 6:
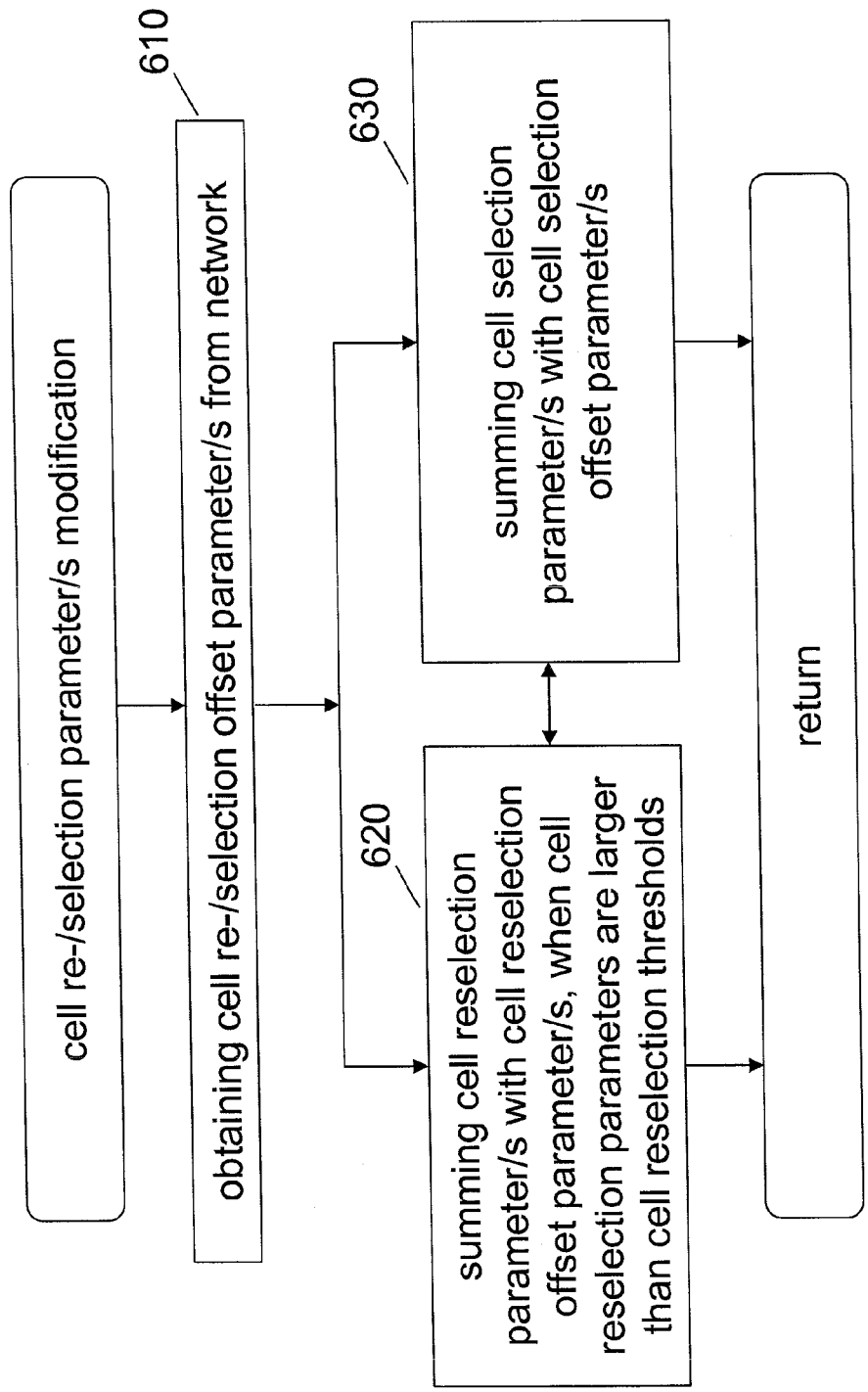
FIG. 6 shows a flowchart of a third example of a procedure for cell re-/selection parameter/s modification according to exemplary embodiments of the present invention.

FIG. 6 shows a flowchart of a third example of a procedure for cell re-/selection parameter/s modification according to exemplary embodiments of the present invention.

As shown in FIG. 6, a corresponding procedure according to exemplary embodiments of the present invention comprises an operation (610) of obtaining one or more of the cell re-/selection offset parameter/s from a network entity. The operations 620 and 630 according to FIG. 6 functionally correspond to the operations 410 and 420 according to FIG. 4, which are based on the results of the preceding operation 610 according to FIG. 6. That is to say, in any one of the operations 620 and 630, the respective summing operation is performed using the (power/quality-related) cell re-/selection offset parameter/s as obtained in operation 610.

According to exemplary embodiments of the present invention, in the operation 610, the power-related cell reselection offset parameter (e.g. $Q_{rxlev\_CREoffset}$) referring to the serving cell of the device in question performing the procedure may be obtained from a network entity, and/or the quality-related cell reselection offset parameter (e.g. $Q_{qual\_CREoffset}$) referring to the serving cell of the device in question performing the procedure may be obtained from a network entity.

Alternatively or additionally, according to exemplary embodiments of the present invention, in the operation 610, the power-related cell selection offset parameter (e.g. $Q_{target\_cell\_rxlev\_CREoffset}$) referring to the non-serving cell of the device in question performing the procedure may be obtained from a network entity, and/or the quality-related cell selection offset parameter (e.g. $Q_{target\_cell\_qual\_CREoffset}$) referring to the non-serving cell of the device in question performing the procedure may be obtained from a network entity.

According to exemplary embodiments of the present invention, the aforementioned network entity may for example be any network entity being involved in handling cell re-/selection of/for the device in question, such as any network entity (being configured/responsible/dedicated for) performing radio resource control (RRC) or the like. For example, such network entity may comprise a base station or access node of the serving and/or the non-serving cell of the device in question (e.g. NB, eNB or the like), any radio network controlling entity being connected to one or both of these base station or access nodes (e.g. RNC or the like), or any special purpose network entity or server.

It is noted that, while the exemplary procedures according to FIGS. 5 and 6 are separately illustrated, exemplary embodiments of the present invention also involve a combined/integrated procedure on the basis thereof. Namely, exemplary embodiments of the present invention also involve a procedure including the operations 510 and 520 according to FIG. 5 and the operation 610 according to FIG. 6. In such case, for example, the cell re-/selection offset parameter/s may be obtained from a network entity, and the thus obtained cell re-/selection offset parameter/s may then be adjusted in accordance with an accordingly detected received signal level/quality of the observed D2D discovery signal.

Generally, the cell re-/selection offset parameter/s according to exemplary embodiments of the present invention (e.g. $Q_{rxlev\_CREoffset}$, $Q_{qual\_CREoffset}$, $Q_{target\_cell\_rxlev\_CREoffset}$, $Q_{target\_cell\_qual\_CREoffset}$) may be variable or fixed. Specifically, the cell re-/selection offset parameter/s according to exemplary embodiments of the present invention may be partly or fully configurable on a network side (e.g. by the aforementioned network entity), may be partly or fully configurable in the context of or by RRC, or the like. According to exemplary embodiments of the present invention, the cell re-/selection offset parameter/s may be transmitted from the network side to the device in question by way of any RRC signaling and/or broadcasting in/with system information.

Figure 7:
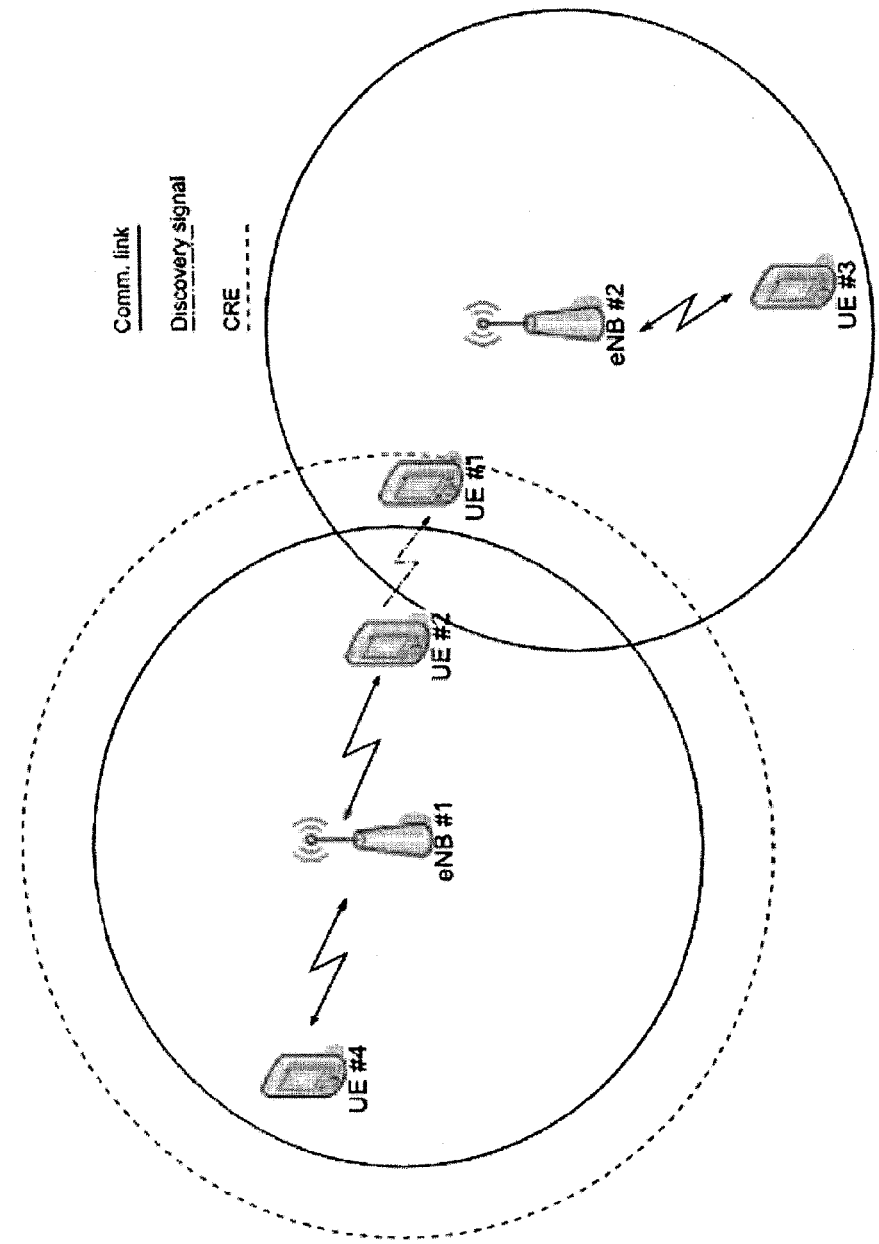
FIG. 7 shows a schematic diagram illustrating a system scenario in the context of D2D communication in a cellular communication system according to exemplary embodiments of the present invention.

FIG. 7 shows a schematic diagram illustrating a system scenario in the context of D2D communication in a cellular communication system according to exemplary embodiments of the present invention.

Generally, the underlying system scenario according to FIG. 7 corresponds to that according to FIG. 1, as explained above. The difference ensues from application of any one of exemplary embodiments of the present invention, as described above in terms of functional and procedural aspects.

As shown in FIG. 7, UE#1, which is again assumed to be in RRC_IDLE state and to be potentially camping on the cell of eNB#2 according to conventional cell re-/selection, observes a D2D discovery signal (which may be or may have been decided to be of interest for UE#1) from UE#2, which is again assumed to be in RRC_CONNECTED state and camping on the cell of eNB#1. Upon observance of the inter-cell D2D discovery signal (the transmitter and receiver of which reside in different cells), UE#1 implements functions and procedures according to any one of exemplary embodiments of the present invention, as described above. As a result thereof, UE#1 modifies its cell re-/selection parameter/s on the basis of the observed D2D discovery signal, and the thus modified cell re-/selection parameter/s eventually cause that cell reselection measurements are (more likely to be) triggered and the range of the non-serving cell will be extended. Therefore, as indicated by a dashed circle in FIG. 7, since UE#1 will reside within the thus extended cell of eNB#1 and will (more likely) perform cell reselection measurements and an associated cell reselection process, UE#1 will eventually camp on the cell of eNB#1, e.g. for feedback and communication setup purposes.

In brief, exemplary embodiments of the present invention enable that the two devices UE#1 and UE#2 are served by the same base station, e.g. from the radio resource control (RRC) point of view, e.g. in terms of setting up a D2D communication link. This may essentially be achieved by way of a modification of cell re-/selection parameter/s according to the observed D2D discovery signal, thus triggering a cell range expansion (CRE) of the non-serving cell and cell reselection of the device in question.

Generally, according to exemplary embodiments of the present invention, any one of the two cells involved, i.e. the cells in which the two proximity devices are residing, may be of any type, such as e.g. a normal/usual/typical cell of a cellular communication system, a macro cell, a micro cell, a pico cell, a femto cell, or the like. In view thereof, the two cells may also be of different types as compared with each other.

As evident from the above, the following technical effects may exemplarily be achieved by virtue of exemplary embodiments of the present invention.

Basically, an improved inter-cell device discovery in device-to-device communication may be achieved. In this regard, a D2D discovery signal may be utilized as a trigger for cell range expansion (CRE) of a non-serving cell of a device in question (and, at the same time, cell reselection of the device in question).

Furthermore, problems arising from a situation that two proximity devices reside in different cells, i.e. are served by different cells or base stations/access nodes thereof, may be resolved. For example, it may be achieved that these two devices are served by the same cell or base station/access node thereof, e.g. from a radio resource control (RRC) point of view. Accordingly, corresponding problems may be at least reduced, exemplarily involving problems in D2D communication link setup, e.g. a possibility of unnecessary handovers when routing devices, while setting up a D2D communication link. For example, a subsequent D2D communication link setup may be simplified accordingly.

Generally, the above-described procedures and functions may be implemented by respective functional elements, processors, or the like, as described below.

While in the foregoing exemplary embodiments of the present invention are described mainly with reference to methods, procedures and functions, corresponding exemplary embodiments of the present invention also cover respective apparatuses, network nodes and systems, including both software and/or hardware thereof.

Respective exemplary embodiments of the present invention are described below referring to FIG. 8, while for the sake of brevity reference is made to the detailed description with regard to FIGS. 1 to 7.

Figure 8:
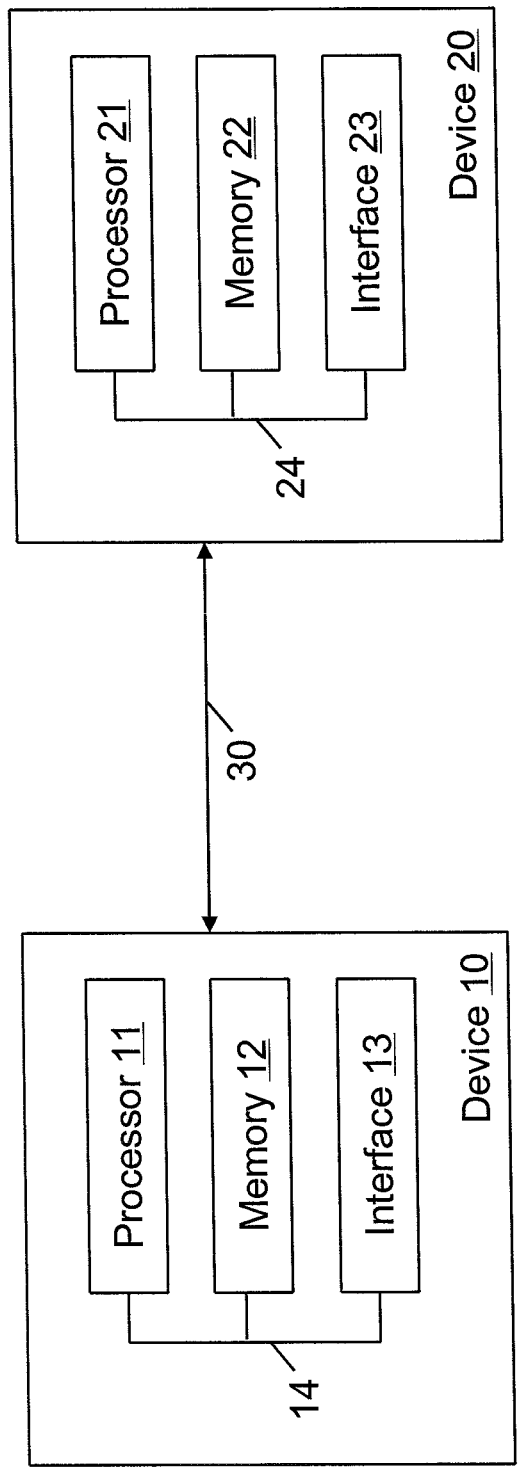
FIG. 8 shows a schematic block diagram illustrating exemplary apparatuses according to exemplary embodiments of the present invention.

In FIG. 8 below, which is noted to represent a simplified block diagram, the solid line blocks are basically configured to perform respective operations as described above. The entirety of solid line blocks are basically configured to perform the methods and operations as described above, respectively. With respect to FIG. 8, it is to be noted that the individual blocks are meant to illustrate respective functional blocks implementing a respective function, process or procedure, respectively. Such functional blocks are implementation-independent, i.e. may be implemented by means of any kind of hardware or software, respectively. The arrows and lines interconnecting individual blocks are meant to illustrate an operational coupling there-between, which may be a physical and/or logical coupling, which on the one hand is implementation-independent (e.g. wired or wireless) and on the other hand may also comprise an arbitrary number of intermediary functional entities not shown. The direction of arrow is meant to illustrate the direction in which certain operations are performed and/or the direction in which certain data is transferred.

Further, in FIG. 8, only those functional blocks are illustrated, which relate to any one of the above-described methods, procedures and functions. A skilled person will acknowledge the presence of any other conventional functional blocks required for an operation of respective structural arrangements, such as e.g. a power supply, a central processing unit, respective memories or the like. Among others, memories are provided for storing programs or program instructions for controlling the individual functional entities to operate as described herein.

FIG. 8 shows a schematic block diagram illustrating exemplary apparatuses according to exemplary embodiments of the present invention.

In view of the above, any one of the thus described apparatuses 10 and 20 is suitable for use in practicing the exemplary embodiments of the present invention, as described herein. Any one of the thus described apparatuses 10 and 20 may function as/on a transmitting side of a D2D discovery signal, and/or as/on a receiving side of a D2D discovery signal. In the following, it is assumed that device 10 functions as/on a receiving side of a D2D discovery signal, while corresponding explanations made with regard to device 10 equally also apply for device 20.

The thus described apparatus 10 may represent a (part of an) device, such as a terminal, mobile station, user equipment or other mobile node or a modem (which may be installed as part of such mobile node, but may be also a separate module, which can be attached to various devices, as described above), and may be configured to perform a procedure and/or functionality as described in conjunction with any one of FIGS. 2 to 6. The thus described apparatus 20 may represent a (part of an) device, such as a terminal, mobile station, user equipment or other mobile node or a modem (which may be installed as part of such mobile node, but may be also a separate module, which can be attached to various devices, as described above). Referring to FIGS. 1 and 7, the device 10 may represent a (part of an) UE#1, and the device 20 may represent a (part of an) UE#2.

As indicated in FIG. 8, according to exemplary embodiments of the present invention, each of the apparatuses comprises a processor 11/22, a memory 12/22 and an interface 13/23, which are connected by a bus 14/24 or the like, and the apparatuses may be connected via a link 30. The link 30 may be a physical and/or logical coupling, which on the one hand is implementation-independent (e.g. wired or wireless).

The processor 11/21 and/or the interface 13/23 may be facilitated for communication over a (hardwire or wireless) link, respectively. The interface 13/23 may comprise a suitable receiver or a suitable transmitter-receiver combination or transceiver, which is coupled to one or more antennas or communication means for (hardwire or wireless) communications with the linked or connected device(s), respectively. The interface 13/23 is generally configured to communicate with another apparatus, i.e. the interface thereof.

The memory 12/22 may store respective programs assumed to include program instructions or computer program code that, when executed by the respective processor, enables the respective electronic device or apparatus to operate in accordance with the exemplary embodiments of the present invention. For example, the memory 12/22 may store current values of any one of the parameters used in respective functions and procedures, a current RRC state, information regarding the network environment or architecture, or the like.

In general terms, the respective devices/apparatuses (and/or parts thereof) may represent means for performing respective operations and/or exhibiting respective functionalities, and/or the respective devices (and/or parts thereof) may have functions for performing respective operations and/or exhibiting respective functionalities.

When in the subsequent description it is stated that the processor (or some other means) is configured to perform some function, this is to be construed to be equivalent to a description stating that at least one processor, potentially in cooperation with computer program code stored in the memory of the respective apparatus, is configured to cause the apparatus to perform at least the thus mentioned function. Also, such function is to be construed to be equivalently implementable by specifically configured means for performing the respective function (i.e. the expression "processor configured to [cause the apparatus to] perform xxx-ing" is construed to be equivalent to an expression such as "means for xxx-ing").

According to exemplary embodiments of the present invention, an apparatus representing the apparatus 10 comprises at least one processor 11, at least one memory 12 including computer program code, and at least one interface 13 configured for communication with at least another apparatus. The processor (i.e. the at least one processor 11, with the at least one memory 12 and the computer program code) is configured to perform observing, at a device residing in a cell representing a serving cell of said device, a device-to-device discovery signal from another device residing in another cell representing a non-serving cell of said device, and modifying at least one of one or more cell reselection parameters referring to the serving cell of said device and one or more cell selection parameters referring to the non-serving cell of said device on the basis of the observed device-to-device discovery signal.

Stated in other words, the apparatus comprises respective means for observing and means for modifying.

According to exemplary embodiments of the present invention, the processor (i.e. the at least one processor 11, with the at least one memory 12 and the computer program code) may be configured to perform any one of the aforementioned operations in any conceivable combination, as described above with reference to FIGS. 2 to 6. Such operations may exemplarily include:
 conducting at least one of a cell re-/selection process on the basis of the modified cell re-/selection parameter/s, respectively, and/or
 summing one or more of a (power/quality-related) cell re-/selection parameter with a (power/quality-related) cell re-/selection offset parameter, respectively, and/or
 detecting at least one of a received signal level and a received signal quality of the device-to-device discovery signal, and adjusting at least one of a (power/quality-related) cell re-/selection offset parameter on the basis of the detected received signal level of the device-to-device discovery signal, respectively, and/or
 obtaining at least one of a (power/quality-related) cell re-/selection offset parameter from a network entity, respectively, and/or
 receiving a device-to-device discovery signal and deciding on an interestingness of the received device-to-device discovery signal in terms of a device-to-device communication link setup between a device in question and another device transmitting the received device-to-device discovery signal.

Stated in other words, the apparatus may comprise respective means for conducting, means for summing, means for detecting, means for adjusting, means for obtaining, and/or means for receiving, respectively.

According to exemplary embodiments of the present invention, it may exemplarily be the case that:
 at least one of a (power/quality-related) cell reselection offset parameter is defined such that a probability of a cell reselection being conducted on the basis of at least one of a modified cell reselection parameter is increased by utilizing the at least one (power/quality-related) cell reselection offset parameter in (power/quality-related) cell reselection parameter modification, and/or
 at least one of the (power/quality-related) cell selection offset parameter is defined such that a range of the non-serving cell is extended for a cell selection process conducted on the basis of at least one of a modified cell reselection parameter by utilizing the at least one (power/quality-related) cell selection offset parameter in (power/quality-related) cell selection parameter modification.

For further details of specifics regarding functionalities according to exemplary embodiments of the present invention, reference is made to the foregoing description in conjunction with FIGS. 2 to 6.

According to exemplarily embodiments of the present invention, a system may comprise any conceivable combination of the thus depicted devices/apparatuses and other network elements, which are configured to cooperate as described above.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any procedural step or functionality is suitable to be implemented as software or by hardware without changing the idea of the present invention. Such software may be software code independent and can be specified using any known or future developed programming language, such as e.g. Java, C++, C, and Assembler, as long as the functionality defined by the method steps is preserved. Such hardware may be hardware type independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components. A device/apparatus may be represented by a semiconductor chip, a chipset, system in package, or a (hardware) module comprising such chip or chipset; this, however, does not exclude the possibility that a functionality of a device/apparatus or module, instead of being hardware implemented, be implemented as software in a (software) module such as a computer program or a computer program product comprising executable software code portions for execution/being run on a processor. A device may be regarded as a device/apparatus or as an assembly of more than one device/apparatus, whether functionally in cooperation with each other or functionally independently of each other but in a same device housing, for example.

Apparatuses and/or means or parts thereof can be implemented as individual devices, but this does not exclude that they may be implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

The present invention also covers any conceivable combination of method steps and operations described above, and any conceivable combination of nodes, apparatuses, modules or elements described above, as long as the above-described concepts of methodology and structural arrangement are applicable.

In view of the above, the present invention and/or exemplary embodiments thereof provide measures for enabling an inter-cell device discovery in device-to-device communication. Such measures may exemplarily comprise observing, at a device residing in a cell representing a serving cell of said device, a device-to-device discovery signal from another device residing in another cell representing a non-serving cell of said device, and modifying at least one of one or more cell reselection parameters referring to the serving cell of said device and one or more cell selection parameters referring to the non-serving cell of said device on the basis of the observed device-to-device discovery signal.

The measures according to exemplary embodiments of the present invention may be applied for any kind of network environment, such as for example for those in accordance with 3GPP RAN1/RAN2/RAN3 standards and/or 3GPP LTE standards of release 10/11/12/ . . . (LTE/LTE-Advanced and its evolutions). Specifically, the measures according to exemplary embodiments of the present invention may exemplarily be applied in the context of UE procedures in idle mode in/for E-UTRA, RRC protocol specification in/for E-UTRA, E-UTRA/E-UTRAN overall specification, and GPRS enhancements for E-UTRAN access.

Even though the present invention and/or exemplary embodiments are described above with reference to the examples according to the accompanying drawings, it is to be understood that they are not restricted thereto. Rather, it is apparent to those skilled in the art that the present invention can be modified in many ways without departing from the scope of the inventive idea as disclosed herein.

LIST OF ACRONYMS AND ABBREVIATIONS

3GPP Third Generation Partnership Project
CDMA Code Division Multiple Access
CRE Cell Range Expansion
D2D Device-to-Device
dB decibel
E-UTRA Evolved Universal Terrestrial Radio Access
E-UTRAN Evolved Universal Terrestrial Radio Access Network
eNB evolved Node B (E-UTRAN base station)
GPRS General Packet Radio System
GSM Global System for Mobile Communications
LTE Long Term Evolution
LTE-A Long Term Evolution Advanced
NB Node B
RNC Radio Network Controller
RRC Radio Resource Control
RSRP Reference Signal Received Power
RSRQ Reference Signal Received Quality
UE User Equipment
UMTS Universal Mobile Telecommunications System
WCDMA Wideband Code Division Multiple Access

What is claimed is:

1. A method comprising
observing, at a first user equipment residing in a cell representing a serving cell of said first user equipment, a device-to-device discovery signal that is directly received from a second user equipment residing in another cell representing a non-serving cell of the first user equipment, and
on the basis of the observed device-to-device discovery signal, modifying at least one of one or more cell reselection parameters which the first user equipment uses to reselect the serving cell and one or more cell selection parameters which the first user equipment uses to select the non-serving cell,
wherein the modifying comprises at least one of:
summing a power-related cell reselection parameter referring to the serving cell of the first user equipment with a power-related cell reselection offset parameter referring to the serving cell of the first user equipment and/or summing a quality-related cell reselection parameter referring to the serving cell of the first user equipment with a quality-related cell reselection offset parameter referring to the serving cell of the first user equipment, when the power-related cell reselection parameter referring to the serving cell is larger than a power-related cell reselection threshold and/or the quality-related cell reselection parameter referring to the serving cell is larger than a quality-related cell reselection threshold; and
summing a power-related cell selection parameter referring to the non-serving cell of the first user equipment with a power-related cell selection offset parameter referring to the non-serving cell of the first user equipment and/or summing a quality-related cell selection parameter referring to the non-serving cell of the first user equipment with a quality-related cell selection offset parameter referring to the non-serving cell of the user equipment.

2. The method according to claim 1, further comprising conducting at least one of a cell reselection process referring to the serving cell of the first user equipment on the basis of the modified one or more cell reselection parameters and a cell selection process referring to the non-serving cell of the first user equipment on the basis of the modified one or more cell selection parameters.

3. The method according to claim 1, wherein the modifying comprises
summing the power-related cell reselection parameter referring to the serving cell of the first user equipment with the power-related cell reselection offset parameter referring to the serving cell of the first user equipment and/or summing the quality-related cell reselection parameter referring to the serving cell of the first user equipment with the quality-related cell reselection offset parameter referring to the serving cell of the first user equipment, when the power-related cell reselection parameter referring to the serving cell is larger than the power-related cell reselection threshold and/or the quality-related cell reselection parameter referring to the serving cell is larger than the quality-related cell reselection threshold.

4. The method according to claim 3, further comprising
detecting at least one of a received signal level and a received signal quality of the device-to-device discovery signal, and
adjusting the power-related cell reselection offset parameter referring to the serving cell of the first user equipment on the basis of the detected received signal level of the device-to-device discovery signal and/or adjusting the quality-related cell reselection offset parameter referring to the serving cell of the first user equipment on the basis of the detected received signal quality of the device-to-device discovery signal.

5. The method according to claim 1, wherein the modifying comprises
summing the power-related cell selection parameter referring to the non-serving cell of the first user equipment with the power-related cell selection offset parameter referring to the non-serving cell of the first user equipment and/or summing the quality-related cell selection parameter referring to the non-serving cell of the first user equipment with the quality-related cell selection offset parameter referring to the non-serving cell of the user equipment.

6. The method according to claim 5, further comprising
detecting at least one of a received signal level and a received signal quality of the device-to-device discovery signal, and
adjusting the power-related cell selection offset parameter referring to the non-serving cell of the first user equipment on the basis of the detected received signal level of the device-to-device discovery signal and/or adjusting the quality-related cell selection offset parameter referring to the non-serving cell of the first user equipment on the basis of the detected received signal quality of the device-to-device discovery signal.

7. The method according to claim 5, wherein
at least one of the power-related cell selection offset parameter referring to the non-serving cell of the first user equipment and the quality-related cell selection offset parameter referring to the non-serving cell of the first user equipment is defined such that said summing extends a range of the non-serving cell for a cell selection process referring to the non-serving cell of the first user equipment conducted on the basis of the thus modified one or more cell selection parameters, and/or
the method further comprises obtaining at least one of the power-related cell selection offset parameter referring to the non-serving cell of the first user equipment and the quality-related cell selection offset parameter referring to the non-serving cell of the first user equipment from a network entity.

8. The method according to claim 1, wherein
the first user equipment is in an idle state in terms of radio resource control, and/or
the device-to-device discovery signal comprises a cell identifier of the non-serving cell, and/or
the observing comprises receiving the device-to-device discovery signal and deciding on an interestingness of the received device-to-device discovery signal in terms of a device-to-device communication link setup between the first user equipment and the second user equipment.

9. The method according to claim 1, wherein
the method is operable at or by a terminal, user equipment, mobile station or modem, and/or the method is operable in a long-term evolution cellular system.

10. An apparatus comprising
at least one processor,
at least one memory including computer program code, and
at least one interface configured for communication with at least another apparatus,
the at least one processor, with the at least one memory and the computer program code, being configured to cause the apparatus to perform:
observing, at a first user equipment residing in a cell representing a serving cell of the first user equipment, a device-to-device discovery signal from a second user equipment residing in another cell representing a non-serving cell of the first user equipment, and
on the basis of the observed device-to-device discovery signal, modifying at least one of one or more cell reselection parameters which the first user equipment uses to reselect the serving cell and one or more cell selection parameters which the first user equipment uses to select the non-serving cell
wherein the modifying comprises at least one of:
summing a power-related cell reselection parameter referring to the serving cell of the first user equipment with a power-related cell reselection offset parameter referring to the serving cell of the first user equipment and/or summing a quality-related cell reselection parameter referring to the serving cell of the first user equipment with a quality-related cell reselection offset parameter referring to the serving cell of the first user equipment, when the power-related cell reselection parameter referring to the serving cell is larger than a power-related cell reselection threshold and/or the quality-related cell reselection parameter referring to the serving cell is larger than a quality-related cell reselection threshold; and
summing a power-related cell selection parameter referring to the non-serving cell of the first user equipment with a power-related cell selection offset parameter referring to the non-serving cell of the first user equipment and/or summing a quality-related cell selection parameter referring to the non-serving cell of the first user equipment with a quality-related cell selection offset parameter referring to the non-serving cell of the first user equipment.

11. The apparatus according to claim 10, wherein the at least one processor, with the at least one memory and the computer program code, is configured to cause the apparatus to perform:

conducting at least one of a cell reselection process referring to the serving cell of the first user equipment on the basis of the modified one or more cell reselection parameters and a cell selection process referring to the non-serving cell of the first user equipment on the basis of the modified one or more cell selection parameters.

12. The apparatus according to claim 10, wherein the at least one processor, with the at least one memory and the computer program code, is configured to cause the apparatus to perform:
summing the power-related cell reselection parameter referring to the serving cell of the first user equipment with the power-related cell reselection offset parameter referring to the serving cell of the first user equipment and/or summing the quality-related cell reselection parameter referring to the serving cell of the first user equipment with the quality-related cell reselection offset parameter referring to the serving cell of the first user equipment, when the power-related cell reselection parameter referring to the serving cell is larger than the power-related cell reselection threshold and/or the quality-related cell reselection parameter referring to the serving cell is larger than the quality-related cell reselection threshold.

13. The apparatus according to claim 12, wherein the at least one processor, with the at least one memory and the computer program code, is configured to cause the apparatus to perform:
detecting at least one of a received signal level and a received signal quality of the device-to-device discovery signal, and
adjusting the power-related cell reselection offset parameter referring to the serving cell of the first user equipment on the basis of the detected received signal level of the device-to-device discovery signal and/or adjusting the quality-related cell reselection offset parameter referring to the serving cell of the first user equipment on the basis of the detected received signal quality of the device-to-device discovery signal.

14. The apparatus according to claim 10, wherein the at least one processor, with the at least one memory and the computer program code, is configured to cause the apparatus to perform:
summing the power-related cell selection parameter referring to the non-serving cell of the first user equipment with the power-related cell selection offset parameter referring to the non-serving cell of the first user equipment and/or summing the quality-related cell selection parameter referring to the non-serving cell of the first user equipment with the quality-related cell selection offset parameter referring to the non-serving cell of the first user equipment.

15. The apparatus according to claim 14, wherein the at least one processor, with the at least one memory and the computer program code, is configured to cause the apparatus to perform:
detecting at least one of a received signal level and a received signal quality of the device-to-device discovery signal, and
adjusting the power-related cell selection offset parameter referring to the non-serving cell of the first user equipment on the basis of the detected received signal level of the device-to-device discovery signal and/or adjusting the quality-related cell selection offset parameter referring to the non-serving cell of the first user equipment on the basis of the detected received signal quality of the device-to-device discovery signal.

16. The apparatus according to claim 14, wherein
at least one of the power-related cell selection offset parameter referring to the non-serving cell of the first user equipment and the quality-related cell selection offset parameter referring to the non-serving cell of the first user equipment is defined such that said summing extends a range of the non-serving cell for a cell selection process referring to the non-serving cell of the first user equipment conducted on the basis of the thus modified one or more cell selection parameters, and/or
wherein the at least one processor, with the at least one memory and the computer program code, is configured to cause the apparatus to perform: obtaining at least one of the power-related cell selection offset parameter referring to the non-serving cell of the first user equipment and the quality-related cell selection offset parameter referring to the non-serving cell of the first user equipment from a network entity.

17. The apparatus according to claim 10, wherein
the first user equipment is in an idle state in terms of radio resource control, and/or
the device-to-device discovery signal comprises a cell identifier of the non-serving cell, and/or
the at least one processor, with the at least one memory and the computer program code, is configured to cause the apparatus to perform: receiving the device-to-device discovery signal and deciding on an interestingness of the received device-to-device discovery signal in terms of a device-to-device communication link setup between the first user equipment and the second user equipment.

18. The apparatus according to claim 10, wherein the apparatus is operable as or at a terminal, user equipment, mobile station or modem, and/or the apparatus is operable in accordance with a long-term evolution cellular system.

19. A non-transitory computer-readable storage medium storing a computer program comprising computer-executable computer program code which, when the program is run on a computer, is configured to cause the computer to:
observe, at a first user equipment residing in a cell representing a serving cell of said first user equipment, a device-to-device discovery signal that is directly received from a second user equipment residing in another cell representing a non-serving cell of the first user equipment, and
on the basis of the observed device-to-device discovery signal, modify at least one of one or more cell reselection parameters which the first user equipment uses to reselect the serving cell and one or more cell selection parameters which the first user equipment uses to select the non-serving cell
wherein the modifying comprises at least one of:
summing a power-related cell reselection parameter referring to the serving cell of the first user equipment with a power-related cell reselection offset parameter referring to the serving cell of the first user equipment and/or summing a quality-related cell reselection parameter referring to the serving cell of the first user equipment with a quality-related cell reselection offset parameter referring to the serving cell of the first user equipment, when the power-related cell reselection parameter referring to the serving cell is larger than a power-related cell reselection threshold and/or the quality-related cell reselection parameter referring to the serving cell is larger than a quality-related cell reselection threshold; and
summing a power-related cell selection parameter referring to the non-serving cell of the first user equipment with a power-related cell selection offset parameter referring to the non-serving cell of the first user equipment and/or summing a quality-related cell selection parameter referring to the non-serving cell of the first user equipment with a quality-related cell selection offset parameter referring to the non-serving cell of the user equipment.

20. The non-transitory computer-readable storage medium according to claim 19, wherein the first user equipment enables an inter-cell device discovery so as to facilitate that the first user equipment and the second user equipment initially residing in different cells are served by the same base station upon the inter-cell device discovery.

* * * * *